(12) United States Patent
Reeves

(10) Patent No.: US 12,553,169 B2
(45) Date of Patent: Feb. 17, 2026

(54) SYSTEMS AND METHODS FOR ENERGY MANAGEMENT OF AN APPLIANCE DURING A POWER INTERRUPTION

(71) Applicant: Haier US Appliance Solutions, Inc., Wilmington, DE (US)

(72) Inventor: Joshua Reeves, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 804 days.

(21) Appl. No.: 17/961,959

(22) Filed: Oct. 7, 2022

(65) Prior Publication Data

US 2024/0117549 A1 Apr. 11, 2024

(51) Int. Cl.
| | | |
|---|---|---|
| *D06F 34/10* | (2020.01) | |
| *D06F 34/05* | (2020.01) | |
| *D06F 34/14* | (2020.01) | |
| *D06F 58/02* | (2006.01) | |
| *D06F 58/36* | (2020.01) | |
| *D06F 58/50* | (2020.01) | |

(Continued)

(52) U.S. Cl.
CPC ............ *D06F 34/10* (2020.02); *D06F 34/05* (2020.02); *D06F 34/14* (2020.02); *D06F 58/02* (2013.01); *D06F 58/36* (2020.02); *D06F 58/50* (2020.02); *F24F 11/46* (2018.01); *D06F 2101/20* (2020.02); *D06F 2103/44* (2020.02); *D06F 2105/28* (2020.02); *D06F 2105/54* (2020.02); *D06F 2105/58* (2020.02)

(58) Field of Classification Search
CPC .......... D06F 34/10; D06F 34/05; D06F 34/14; D06F 58/50; D06F 58/36; D06F 58/02; D06F 2103/44; D06F 2105/28; D06F 2105/58; D06F 2105/54; D06F 2101/20; F24F 11/46

See application file for complete search history.

(56) References Cited

U.S. PATENT DOCUMENTS

| | | | | |
|---|---|---|---|---|
| 3,944,841 A | * | 3/1976 | Janke | ...................... D06F 34/10 |
| | | | | 34/528 |
| 5,193,292 A | * | 3/1993 | Hart | ...................... D06F 58/48 |
| | | | | 34/527 |

(Continued)

FOREIGN PATENT DOCUMENTS

| | | |
|---|---|---|
| JP | 2016100917 A | 5/2016 |
| TW | M562863 U | 7/2018 |
| WO | WO2011157672 A1 | 12/2011 |

Primary Examiner — Edelmira Bosques
Assistant Examiner — Bao D Nguyen
(74) Attorney, Agent, or Firm — Dority & Manning, P.A.

(57) ABSTRACT

A method of operating a laundry treatment appliance includes detecting a power interruption between a primary power source and the laundry treatment appliance; determining an operational status of the laundry treatment appliance after detecting the power interruption, the operational status including a current cycle of the laundry treatment appliance; analyzing a plurality of operating conditions of the current cycle; activating a secondary power source to the laundry treatment appliance based on analyzing the plurality of operating conditions of the current cycle; and implementing a responsive action in response to activating the secondary power source to the laundry treatment appliance, the responsive action including altering at least one of the plurality of operating conditions of the current cycle.

18 Claims, 3 Drawing Sheets

(51) Int. Cl.
*F24F 11/46* (2018.01)
*D06F 101/20* (2020.01)
*D06F 103/44* (2020.01)
*D06F 105/28* (2020.01)
*D06F 105/54* (2020.01)
*D06F 105/58* (2020.01)

(56) References Cited

U.S. PATENT DOCUMENTS

| | | | | |
|---|---|---|---|---|
| 5,443,541 | A * | 8/1995 | St. Louis | D06F 34/08 |
| | | | | 34/562 |
| 5,560,124 | A * | 10/1996 | Hart | D06F 58/48 |
| | | | | 34/535 |
| 6,061,668 | A * | 5/2000 | Sharrow | G07F 5/18 |
| | | | | 705/30 |
| 8,775,848 | B2 | 7/2014 | Vankatakrishnan et al. | |
| 10,181,803 | B2 * | 1/2019 | Choi | H02J 9/062 |
| 2001/0025349 | A1 * | 9/2001 | Sharood | G06Q 30/0236 |
| | | | | 713/340 |
| 2002/0008488 | A1 * | 1/2002 | Pearson | D06F 58/48 |
| | | | | 318/599 |
| 2005/0116814 | A1 * | 6/2005 | Rodgers | H02J 3/14 |
| | | | | 340/538 |
| 2006/0010937 | A1 * | 1/2006 | Kim | D06F 33/47 |
| | | | | 68/16 |
| 2010/0019574 | A1 | 1/2010 | Baldassarre et al. | |
| 2012/0032514 | A1 * | 2/2012 | Alberghetti | A47L 15/4293 |
| | | | | 307/48 |
| 2013/0124000 | A1 | 5/2013 | Matsumoto et al. | |
| 2016/0042377 | A1 | 2/2016 | Ilic et al. | |
| 2017/0052515 | A1 * | 2/2017 | Meusburger | D06F 34/05 |
| 2017/0146260 | A1 * | 5/2017 | Ribbich | G05B 19/0426 |
| 2017/0319883 | A1 * | 11/2017 | Akers | G10K 7/06 |
| 2018/0016727 | A1 * | 1/2018 | Heo | D06F 37/04 |
| 2018/0030637 | A1 * | 2/2018 | Heo | G05B 19/042 |
| 2018/0144595 | A1 * | 5/2018 | Akers | A62C 37/11 |
| 2018/0195223 | A1 * | 7/2018 | Choi | D06F 31/00 |
| 2019/0106827 | A1 * | 4/2019 | Heo | H02H 3/08 |
| 2020/0248360 | A1 * | 8/2020 | Sans Serra | D06F 34/10 |
| 2021/0356153 | A1 * | 11/2021 | Nesler | F24F 11/46 |
| 2023/0407543 | A1 * | 12/2023 | Ansaldi | D06F 34/05 |
| 2024/0426499 | A1 * | 12/2024 | Chaiklin | F24F 11/46 |

* cited by examiner

SYSTEMS AND METHODS FOR ENERGY MANAGEMENT OF AN APPLIANCE DURING A POWER INTERRUPTION

FIELD OF THE INVENTION

The present subject matter relates generally to laundry treatment appliances, and more particularly to energy management of laundry treatment appliances during a power interruption

BACKGROUND OF THE INVENTION

Laundry treatment appliances (such as dryer appliances) generally include a cabinet with a drum rotatably mounted therein. During operation, a motor rotates the drum, e.g., to tumble articles located within a chamber defined by the drum. Dryer appliances also generally include a heater assembly that passes heated air through the chamber in order to dry moisture-laden articles positioned therein. Typically, an air handler or blower is used to urge the flow of heated air from chamber, through a trap duct, and to the exhaust duct where it is exhausted from the dryer appliance. Accordingly, laundry treatment appliances typically require a substantial amount of power to operate, typically from a municipal power source.

In some households, secondary or back-up power sources are provided in the event of a primary power outage to the household. Such back-up power sources may include batteries, generators, or the like. Generally, these secondary power sources have limited amounts of stored power or energy which may be delivered to a plurality of appliances within the household. When multiple appliances are being operated simultaneously, the power draw from the secondary power source may be greater than a limit to which the secondary power source can operate. Accordingly, certain drawbacks exist when secondary power sources are utilized. For instance, operational tendencies of multiple appliances are not considered.

Accordingly, a laundry treatment appliance that obviates one or more of the above-mentioned drawbacks would be beneficial. In particular, a laundry treatment appliance that monitors and prioritizes power needs during a power interruption would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a laundry treatment appliance is provided. The method may include detecting a power interruption between a primary power source and the laundry treatment appliance; activating a secondary power source to the laundry treatment appliance based on detecting the power interruption between the primary power source and the laundry treatment appliance; determining an operational status of the laundry treatment appliance after activating the secondary power source, the operational status including a current cycle of the laundry treatment appliance; determining a plurality of operating conditions of the current cycle; and implementing a responsive action in response to determining the plurality of operating conditions, the responsive action including altering at least one of the plurality of operating conditions of the current cycle.

In another exemplary aspect of the present disclosure, a laundry treatment appliance is provided. The laundry treatment appliance may include a cabinet; a drum rotatably provided within the cabinet; an air circulation system selectively supplying air to the drum; a heater provided in the air circulation system; and a controller operably coupled to the drum, the air circulation system, and the heater, the controller being configured to perform an operation. The operation may include detecting a power interruption between a primary power source and the laundry treatment appliance; activating a secondary power source to the laundry treatment appliance based on detecting the power interruption between the primary power source and the laundry treatment appliance; determining an operational status of the laundry treatment appliance after activating the secondary power source, the operational status including a current cycle of the laundry treatment appliance; determining a plurality of operating conditions of the current cycle; and implementing a responsive action in response to determining the plurality of operating conditions, the responsive action including altering at least one of the plurality of operating conditions of the current cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
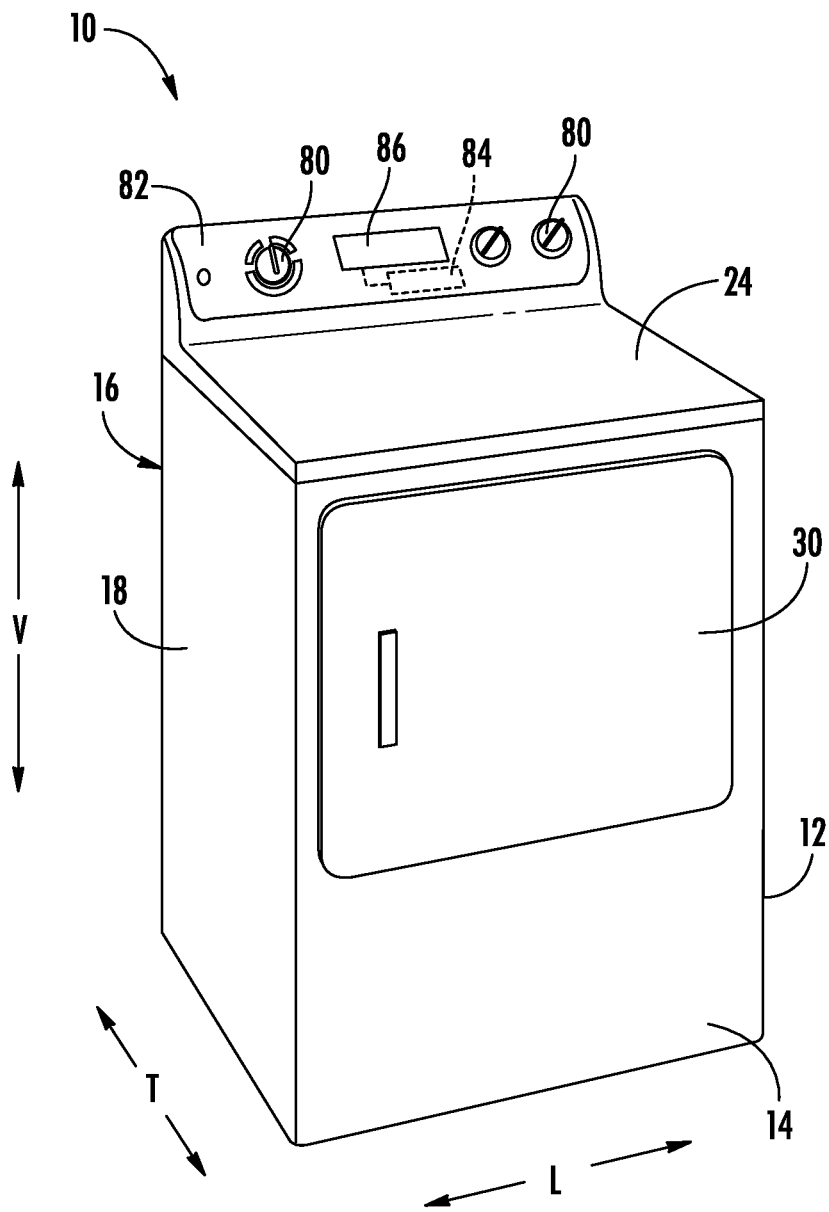
FIG. 1 provides a perspective view of a laundry treatment appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
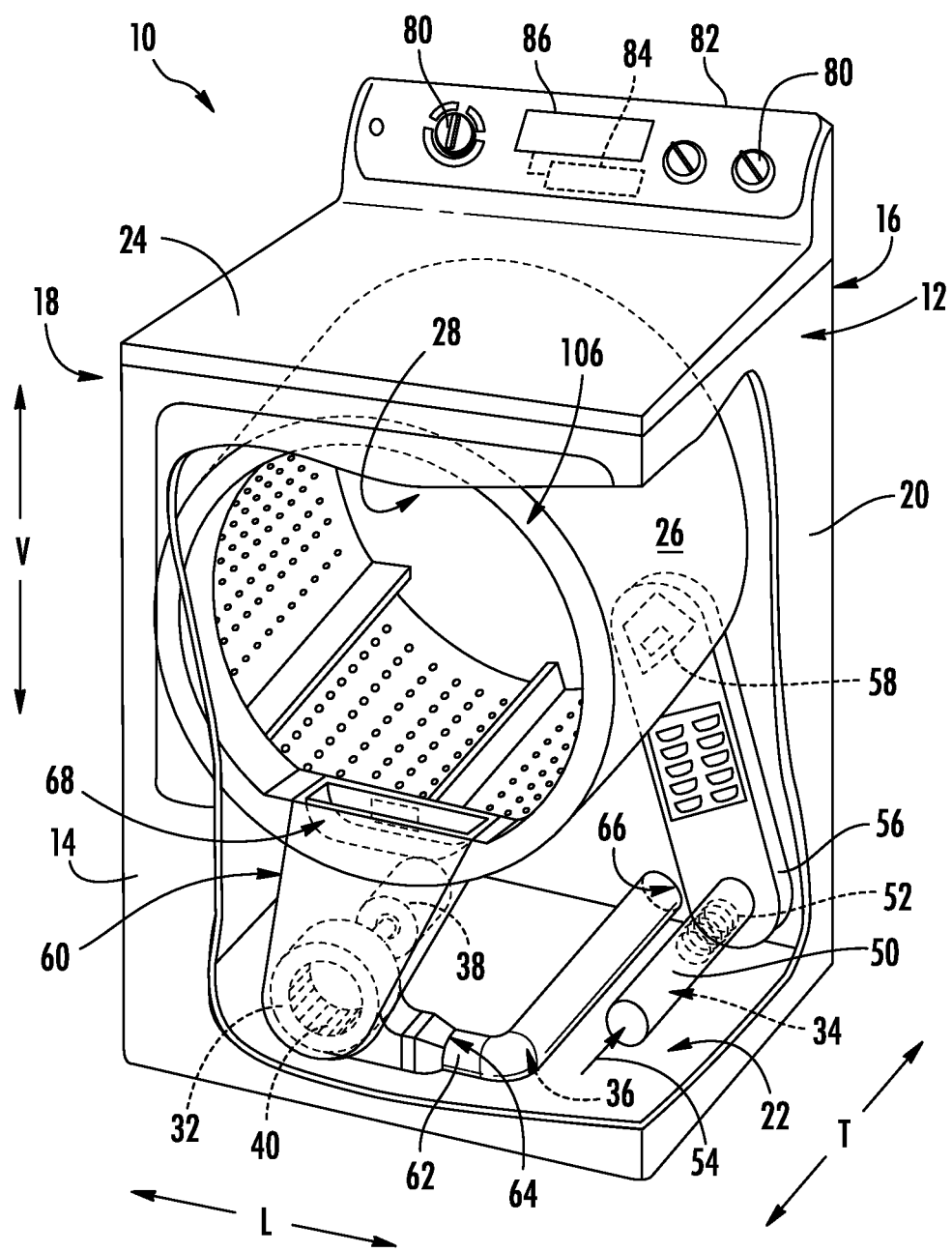
FIG. 2 provides a perspective view of the exemplary laundry treatment appliance of FIG. 1 with portions of a cabinet of the exemplary laundry treatment appliance removed to reveal certain components of the exemplary laundry treatment appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

One or more selector inputs 80, such as knobs, buttons, touchscreen interfaces, etc., may be provided on a cabinet backsplash 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on cabinet backsplash 82. Display 86 may be in communication with controller 84 and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10 and/or one or more airflow sensors which are generally operable to detect the velocity of air (e.g., as an air flow rate in meters per second, or as a volumetric velocity in cubic meters per second) as it flows through the appliance 10. In some embodiments, controller 84 is configured to vary operation of heating assembly 50 based on one or more temperatures detected by the temperature sensors or air flow measurements from the airflow sensors.

Now that the construction of dryer appliance 10 and the configuration of controller 84 according to exemplary embodiments have been presented, an exemplary method 200 of operating a dryer appliance will be described. Although the discussion below refers to the exemplary method 200 of operating dryer appliance 10, one skilled in the art will appreciate that the exemplary method 200 is applicable to the operation of a variety of other dryer appliances or other suitable appliances. In exemplary embodiments, the various method steps as disclosed herein may be performed by controller 84 or a separate, dedicated controller. Advantageously, according to the method 200 described herein, a laundry treatment appliance such as a dryer appliance may be efficiently and economically powered via a secondary power source in the event of a main power outage. Moreover, the method 200 may analyze one or more operational features of the laundry treatment appliance in light of additional connected appliances.

Figure 3:
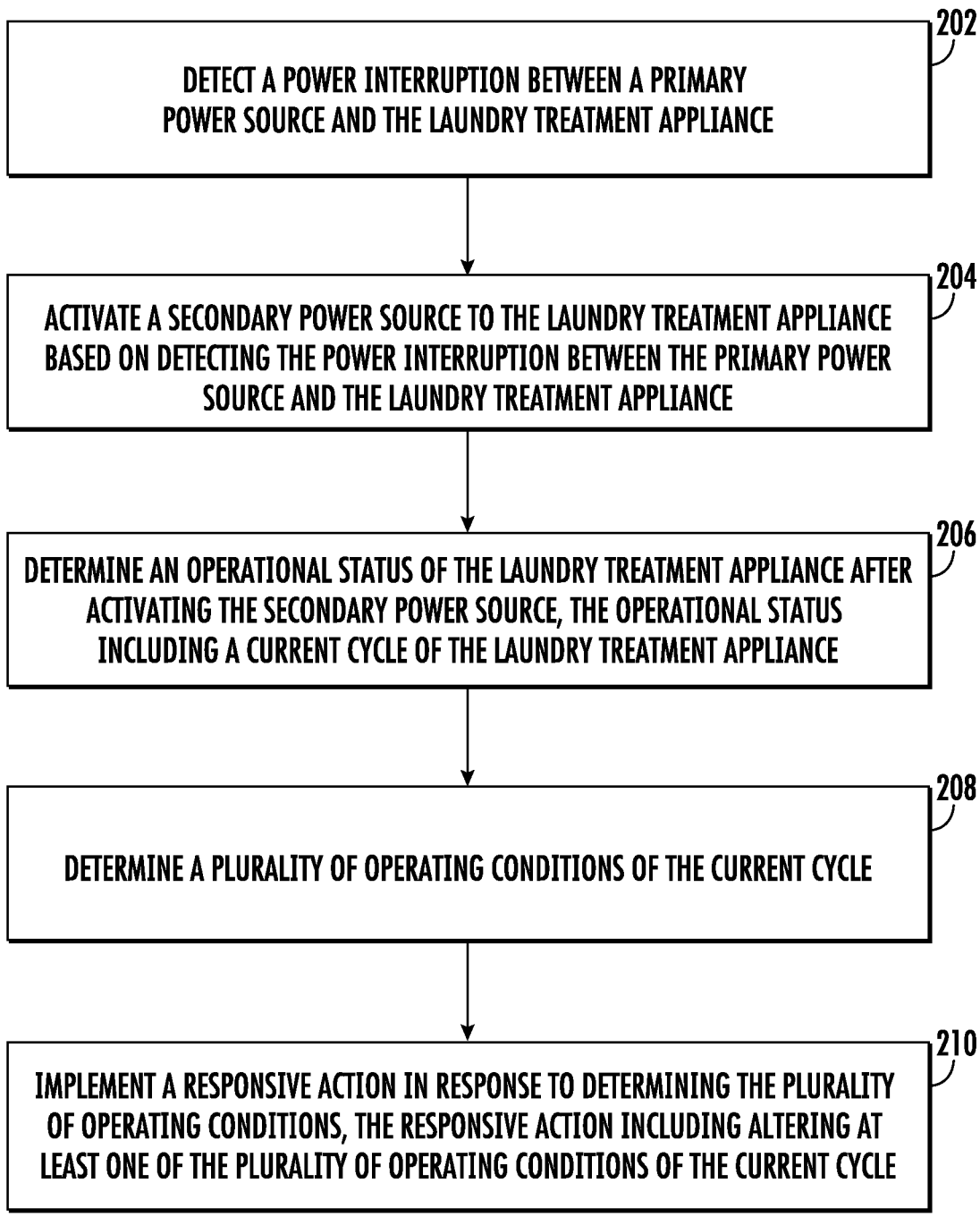
FIG. 3 provides a method of operating a laundry treatment appliance according to exemplary embodiments of the present disclosure.

Referring to FIG. 3, at step 202, method 200 may include detecting a power interruption between a primary power source and a laundry treatment appliance (e.g., laundry treatment appliance 10). For instance, the laundry treatment appliance may be primarily powered by a municipal power supply, such as a city or other local power grid. Additionally or alternatively, the appliance may be powered by a dedicated primary battery source, a fueled generator, or the like. At times, the power produced by the primary power source may be interrupted (e.g., by a municipal power outage). The appliance (e.g., via a controller or sensor provided therein) may detect that the power from the primary power source has been interrupted (e.g., via a secondary power source, described below).

At step 204, method 200 may include activating a secondary power source to the laundry treatment appliance based on detecting the power interruption between the primary power source and the laundry treatment appliance. In detail, the method 200 may include providing power to the laundry treatment appliance via a secondary or back-up power source during the power interruption of the primary power source. The secondary power source may be any suitable unit or system electrically connected to the laundry treatment appliance and capable of providing adequate power to the laundry treatment appliance, such as a battery pack, a battery or power wall, a generator (e.g., a gasoline or fossil fuel generator), a vehicle alternator, a solar generator, a geothermal generator, or the like. Thus, after detecting the power interruption, secondary power is supplied to the appliance such that the current cycle is not interrupted. For instance, the secondary power source may be configured to immediately activate when the primary power source is interrupted.

At step 206, method 200 may include determining an operational status of the laundry treatment appliance. For instance, after (or in response to) activating the secondary power source, the method 200 may (e.g., via the controller) determine whether the appliance is currently performing an operation (e.g., a drying operation). As described above, the secondary power source may be configured to activate to immediately begin supplying back-up power to the appliance in the event of the primary power interruption. Thus, the method 200 may confirm the power interruption by detecting the activation of the secondary power source. The secondary power source may allow the controller of the appliance, for instance, to monitor the status of the appliance (e.g., regarding the operational status of the appliance).

For example, the controller (via secondary power) determines that a drum of the appliance is currently rotating, a heater is currently activated (e.g., emitting heat), or an air handler or fan is currently activated (e.g., rotating). However, it should be understood that additional or alternative means may be utilized to determine the operational status of the appliance. Moreover, the controller of the appliance may determine that the appliance is not currently operational (e.g., is not being used or performing a laundry cycle such as a drying cycle). Thus, the method 200 may include deactivating the laundry treatment appliance. However, as will be described below, the laundry treatment appliance may be activated with restricted features under certain scenarios.

The operational status of the laundry treatment appliance may include a current cycle thereof. In detail, upon determining that the appliance is currently performing an operation, the method 200 may further determine the current cycle being performed (e.g., the drying cycle). The current cycle may be a standard drying cycle, an enhanced drying cycle (e.g., incorporating one or more additional features), an air fluff cycle, or the like. Thus, the method 200 may move to step 208.

Prior to step 208, the method 200 may include determining a plurality of operating conditions of the current cycle. For instance, one or more operating conditions may be determined via one or more sensors provided within the appliance, as would be understood. Additionally or alternatively, one or more operating conditions may be determined according to user inputs (e.g., at the initiation of the drying cycle), as would be understood. For instance, the plurality of operating conditions may include an airflow condition (e.g., air flow rate through an air supply system), a laundry load size, a cycle progress (e.g., elapsed time or remaining cycle time), a remaining moisture level of the laundry load (e.g., via a moisture sensor or humidity sensor), a heat level (e.g., as input by the user), or the like.

At step 208, method 200 may include analyzing the plurality of operating conditions of the current cycle. In detail, in response to determining that the dryer is currently performing a drying operation when the power interruption occurs, certain features, selections, conditions, or attributes of the drying cycle may be analyzed.

Analyzing the plurality of operating conditions may include determining an operating speed of an air handler to determine a power usage thereof, detecting or receiving a laundry load size via a weight sensor, determining an elapsed time of the current cycle (e.g., a time from an initiation of the current cycle), determining a remaining moisture content within the laundry load, or detecting a heat level of a heater provided in the air supply system). Each of the plurality of operating conditions may be stored and incorporated into an operating determination or responsive action, as will be described below. Moreover, the analyzing of the plurality of operating conditions may include determining a level or amount of power required to complete the drying cycle according to the operating conditions, as will be described.

The method 200 may include estimating a power usage of the laundry treatment appliance through the remaining cycle time of the current cycle. For instance, the controller may factor each of the plurality of operating conditions to determine an estimated amount of power (e.g., in kilowatt-hours (kWh)). The estimated power usage may be determined via one or more onboard algorithms, formulas, charts, look-up tables, or the like. For instance, one or more calculations including each of the plurality of operating conditions may be combined to determine the amount of power required to finish the current cycle (e.g., without altering any of the operating conditions). In some instances, the amount of power required to finish the current cycle is provided to the user as a percentage of power remaining (e.g., from a secondary power source, described below).

In some embodiments, the method 200 includes estimating an interruption period of the detected power interruption between the primary power source and the laundry treatment appliance. For instance, the appliance may initiate a communication to obtain relevant information regarding the power interruption. For one example, the appliance establishes a wireless connection (e.g., via a connected remote device such as a cellular device) to scan (e.g., the Internet) for information regarding a power outage (e.g., via news sources or webpages thereof). As will be described, a secondary or back-up power supply may be provided to attempt the remote connection. Additionally or alternatively, the method 200 may include obtaining or estimating the interruption period by assessing one or more power supply tools (e.g., primary batteries, fuse boxes, etc.).

At step 210, method 200 may include implementing a responsive action based on analyzing the plurality of operating conditions. The responsive action may include altering at least one of the plurality of operating conditions of the current cycle.

In detail, the method 200 may include determining each of an availability of power from the secondary power source (e.g., a battery capacity, a fuel amount, etc.) and the amount of power required to complete the unaltered current cycle (i.e., the current cycle according to all of the prescribed operating conditions prior to 210). For instance, the current cycle may require additional power due to partially blocked airflow through the air supply. In detail, while the current cycle is being performed with the primary power source (e.g., before the power interruption), the controller may detect (e.g., via one or more sensors provided in the air circulation system) that an atypically high (e.g., in comparison to a stored or predetermined baseline) power usage is required to urge the air through the system. Additionally or alternatively, a partially blocked airflow through the air supply may increase a total drying cycle time. With an increased drying cycle time, a heater may need to be cycled multiple times (also reducing a drying rate), requiring additional energy consumption. Such an atypically high power usage may be indicated, for example, by detection of a circulatory fan being driven at a higher speed than a normal speed (e.g., predetermined rotation speed). The controller may then factor in the required extra power when analyzing the amount of power required to complete the unaltered current cycle. Additionally or alternatively, the method 200 may include determining different scenarios for completing the current cycle according to altering at least one of the plurality of operating conditions.

According to one example, the current drying cycle includes a high heat setting as selected by the user. Since the high heat option may require additional power to activate the heater at a high level (e.g., in comparison to an intermediate or default heat level) in addition to circulating air through the drum and rotating the drum, a first power usage (or percent power usage) may be determined for a scenario in which the heater remains active according to the high heat setting. The controller may additionally calculate a second power usage or percent power usage if the heater is deactivated or held in an inactive state. Accordingly, the responsive action may include presenting an option to the user. The option may include two or more potential choices, including a first potential choice corresponding to the first power usage and a second potential choice corresponding to the second power usage. Additionally or alternatively, the option may include adjusted completion times (e.g., in the event the heater is deactivated). The option may be presented to the user on the appliance (e.g., through a user interface) or via a wirelessly connected mobile device.

In additional or alternative embodiments, the implements responsive action is further based on a duration of the interruption period. For instance, the method 200 may include determining that the interruption period of the first power source is greater than a predetermined time period. According to one example, the predetermined time period is between about 45 minutes and about 1 hour. Accordingly, upon determining that the interruption period is greater than the predetermined time period, the method 200 may incorporate an automatic detection operation. The automatic detection operation may include determining that the laundry treatment appliance is in wireless communication with one or more connected home appliances (e.g., a refrigerator, an air conditioner, a stove, a cooktop, a microwave, a washing machine, etc.). According to the automatic detection operation, a hierarchy or priority level of each connected appliance may be determined. For instance, the priority level may be automatically determined according to usage statistics (e.g., usage history), schedules of operation (e.g., time of day, time of year, etc.), power demands (e.g., percentage power required for each appliance over the estimated interruption period), current operation (e.g., oven is currently in use, air conditioner is currently in use, etc.), or the like. The priority level may be preset by a user. For instance, the user may manually predetermine which appliances are to be afforded the highest priority of back-up power during a power interruption. Thus, the method 200 may include consulting a predetermined priority list to evaluate the responsive action.

The method 200 may include determining estimated cycle completion times and power usages for a plurality of scenarios (e.g., based on the priority level of the laundry treatment appliance). For instance, a first scenario may be calculated or determined in which the unaltered current cycle can be completed in the originally calculated time while consuming a first amount of power or energy. A second scenario may be calculated or determined in which the current cycle can be completed with alterations to at least one operating condition while consuming a second amount of power, the second amount of power being less than the first amount of power. Three or more additional scenarios may be calculated or determined in which a plurality of operating conditions are altered to create a plurality of different power usage scenarios. The results may then be presented to the user (similar to the option discussed above). Accordingly, the user may select a desired alteration to the current cycle within the laundry treatment appliance.

According to another embodiment, the method 200 includes establishing tiers of power conservation. In detail, in addition to or alternately from analyzing the automatic detection operation, a plurality of power conservation approaches may be established. For instance, the tiers of power conservation may include a conservative approach, a balanced approach, a non-conservative approach, or the like. According to the conservative approach, certain operating conditions of the current cycle would be altered (e.g., turn off heat, reduce air flow, etc.). The conservative approach may thus correspond to a low energy usage desire for the laundry treatment appliance (e.g., disabling non-essential options). The method 200 may include automatically entering or initiating one of the power conservation approaches. For instance, previous behavioral tendencies of the user may be analyzed (e.g., from stored information packets) to determine a likely desired approach. For one example, the method 200 may determine that during previous power interruptions, the user deactivated such appliances as an air conditioner, a washing machine, and a microwave. According to another embodiment, the user is able to manually select which tier of power consumption to initiate. According to still another embodiment, the user is able to predetermine which appliances are activated or deactivated in the conservative approach (or the balanced approach or the non-conservative approach).

In determining which power conservation approach to initiate, the method 200 may include analyzing the usage of one or more of the connected appliances. For example, upon detecting the power interruption, the method 200 includes detecting any additional appliances which are currently active in the household (e.g., a refrigerator, an air conditioner, a connected washing machine, etc.) and determining or analyzing the operational status of each connected appliance. The operational status of each connected appliance may include whether the appliance is operating or at what power level the appliance is being operated. For example, the method 200 determines that a connected air conditioner has been deactivated (e.g., after the power interruption has been detected). Accordingly, the method 200 may include determining that a conservative approach is desired by the user and subsequently cancel the current cycle of the laundry treatment appliance.

According to another embodiment, the laundry treatment appliance is a dryer and the one or more connected appliances includes a washing machine. Upon detecting the power interruption, the method 200 may include determining that the washing machine is currently performing a washing operation. Accordingly, the system may enable the dryer and prepare for a drying operation upon the conclusion of the washing operation. Thus, the controls of the dryer may not be locked out upon detecting the power interruption when the washing machine is performing the washing operation. For instance, the dryer cycle may be prepared according to the desired or determined power conservation approach.

The method 200 may include determining that the estimated interruption time is less than the predetermined time period. For instance, the estimated interruption time may be determined to be approximately 20 minutes. Accordingly, the method 200 may include activating the secondary power source to operate the laundry treatment appliance according to an air fluff cycle (e.g., without heat). The conservative approach may be implemented to operate the laundry treatment appliance according to a lowest power consumption option until the primary power source is reactivated. Advantageously, according to the method 200, a secondary power source may be utilized according to a desired power approach to complete a drying cycle in the event of a power outage. The drying cycle may be performed while conserving a desired amount of power provided by the secondary power source.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method of operating a laundry treatment appliance, the laundry treatment appliance, the method comprising:
    detecting a power interruption between a primary power source and the laundry treatment appliance;

activating a secondary power source to the laundry treatment appliance based on detecting the power interruption between the primary power source and the laundry treatment appliance;

determining an operational status of the laundry treatment appliance after activating the secondary power source, the operational status comprising a current cycle of the laundry treatment appliance;

determining a plurality of operating conditions of the current cycle; and implementing a responsive action in response to determining the plurality of operating conditions, the responsive action comprising altering at least one of the plurality of operating conditions of the current cycle.

2. The method of claim 1, wherein the plurality of operating conditions comprises:

an airflow condition within the laundry treatment appliance;

a size of a laundry load within the laundry treatment appliance;

a remaining cycle time of the current cycle; and a sensed moisture level of the laundry load.

3. The method of claim 1, further comprising:

estimating an interruption period of the detected power interruption between the primary power source and the laundry treatment appliance; and determining the estimated interruption period is greater than a predetermined time period.

4. The method of claim 3, further comprising:

determining that the laundry treatment appliance is in wireless communication with one or more connected home appliances; and establishing a priority level of the laundry treatment appliance with respect to the one or more connected home appliances.

5. The method of claim 4, wherein the laundry treatment appliance is a dryer and the one or more connected home appliances comprises a washing machine, the method further comprising:

determining that the washing machine is performing a washing operation; and establishing the dryer as a top priority appliance by activating all operating features of the dryer.

6. The method of claim 4, wherein the laundry treatment appliance is a dryer and the one or more connected home appliances comprises an air conditioner appliance, the method further comprising:

determining appliance deactivation of the air conditioner appliance in response to detecting the power interruption between the primary power source and the laundry treatment appliance; and canceling the current cycle of the dryer in response to determining the appliance deactivation of the air conditioner appliance.

7. The method of claim 3, further comprising:

estimating power usage of the laundry treatment appliance throughout a remaining time of the current cycle.

8. The method of claim 7, wherein implementing the responsive action comprises:

presenting a plurality of adjustment options to a user to alter at least one of the plurality of operating conditions.

9. The method of claim 1, further comprising:

estimating an interruption period of the detected power interruption between the primary power source and the laundry treatment appliance; and determining the estimated interruption period is less than a predetermined time period, wherein implementing the responsive action comprises:

disabling a heat option of the current cycle; and completing the current cycle using the secondary power source.

10. A laundry treatment appliance comprising:

a cabinet;

a drum rotatably provided within the cabinet;

an air circulation system selectively supplying air to the drum;

a heater provided in the air circulation system; and a controller operably coupled to the drum, the air circulation system, and the heater, the controller being configured to perform an operation, the operation comprising:

detecting a power interruption between a primary power source and the laundry treatment appliance;

activating a secondary power source to the laundry treatment appliance based on detecting the power interruption between the primary power source and the laundry treatment appliance;

determining an operational status of the laundry treatment appliance after activating the secondary power source, the operational status comprising a current cycle of the laundry treatment appliance;

determining a plurality of operating conditions of the current cycle; and implementing a responsive action in response to determining the plurality of operating conditions, the responsive action comprising altering at least one of the plurality of operating conditions of the current cycle.

11. The laundry treatment appliance of claim 10, wherein the plurality of operating conditions comprises:

an airflow condition within the laundry treatment appliance;

a size of a laundry load within the laundry treatment appliance;

a remaining cycle time of the current cycle; and a sensed moisture level of the laundry load.

12. The laundry treatment appliance of claim 10, wherein the operation further comprises:

estimating an interruption period of the detected power interruption between the primary power source and the laundry treatment appliance; and determining the estimated interruption period is greater than a predetermined time period.

13. The laundry treatment appliance of claim 12, wherein the operation further comprises:

determining that the laundry treatment appliance is in wireless communication with one or more connected home appliances; and establishing a priority level of the laundry treatment appliance with respect to the one or more connected home appliances.

14. The laundry treatment appliance of claim 13, wherein the laundry treatment appliance is a dryer and the one or more connected home appliances comprises a washing machine, and wherein the operation further comprises:

determining that the washing machine is performing a washing operation; and establishing the dryer as a top priority appliance by activating all operating features of the dryer.

15. The laundry treatment appliance of claim 13, wherein the laundry treatment appliance is a dryer and the one or more connected home appliances comprises an air conditioner appliance, and wherein the operation further comprises:
- determining an appliance deactivation of the air conditioner appliance in response to detecting the power interruption between the primary power source and the laundry treatment appliance; and
- canceling the current cycle of the dryer in response to determining the appliance deactivation of the air conditioner appliance.

16. The laundry treatment appliance of claim 12, wherein the operation further comprises:
- estimating a power usage of the laundry treatment appliance throughout a remaining cycle time of the current cycle.

17. The laundry treatment appliance of claim 16, wherein implementing the responsive action comprises:
- presenting a plurality of adjustment options to a user to alter at least one of the plurality of operating conditions.

18. The laundry treatment appliance of claim 10, wherein the operation further comprises:
- estimating an interruption period of the detected power interruption between the primary power source and the laundry treatment appliance; and
- determining the estimated interruption period is less than a predetermined time period, wherein implementing the responsive action comprises:
  - disabling a heat option of the current cycle; and
  - completing the current cycle using the secondary power source.

* * * * *